April 9, 1963
B. E. McARTHUR
3,084,795
MECHANISM FOR BREAKING EXTRUSIONS FROM DIES
Filed Sept. 23, 1959
2 Sheets-Sheet 1
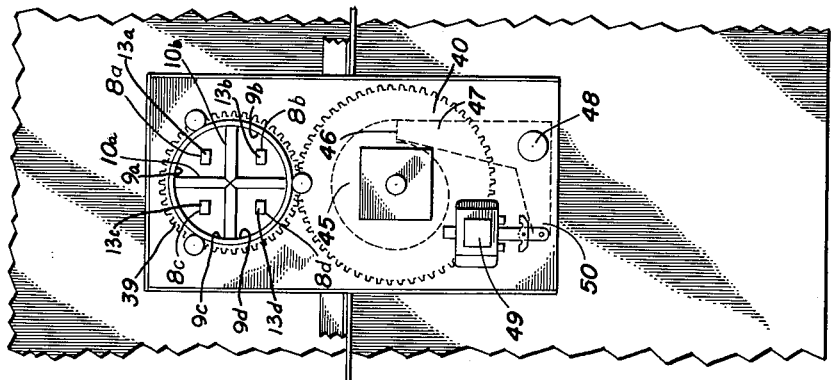
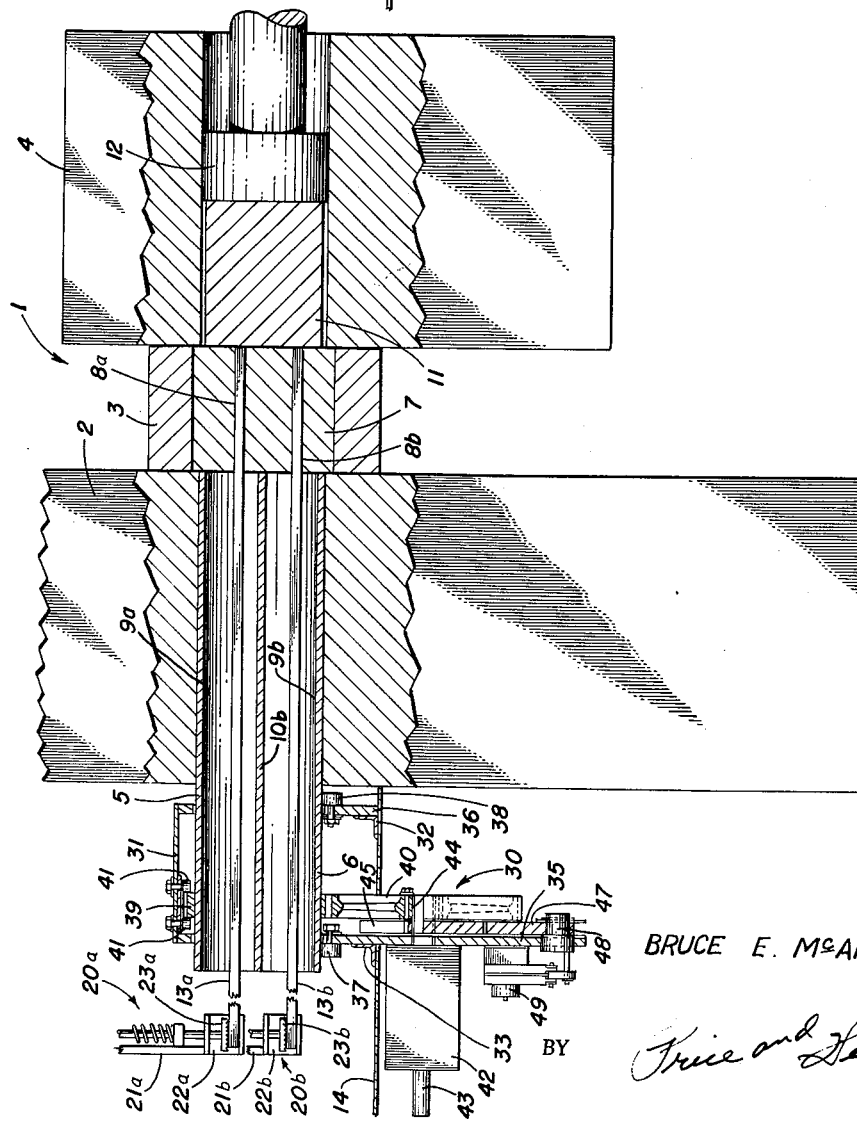
INVENTOR
BRUCE E. McARTHUR
BY
ATTORNEYS April 9, 1963   B. E. McARTHUR   3,084,795
MECHANISM FOR BREAKING EXTRUSIONS FROM DIES
Filed Sept. 23, 1959   2 Sheets-Sheet 2

INVENTOR.
BRUCE E. McARTHUR
BY
*Price and Heneveld*
ATTORNEYS

United States Patent Office 3,084,795
Patented Apr. 9, 1963

3,084,795
MECHANISM FOR BREAKING EXTRUSIONS FROM DIES
Bruce E. McArthur, Canfield, Ohio, assignor to Light Metals Corporation, Grand Rapids, Mich., a corporation of Michigan
Filed Sept. 23, 1959, Ser. No. 841,717
5 Claims. (Cl. 207—1)

This invention relates to an extrusion mechanism and particularly to a mechanism for breaking extrusions from the die in a metal extrusion apparatus. This invention also relates to the method of breaking loose extrusions from the die in a metal extrusion process.

Heretofore, the conventional way of extruding metallic forms and shapes is to heat a billet of metal to a plastic or semi-plastic state and thereafter place the billet in a container located in a press and disposed immediately behind a die. A hydraulic ram is disposed behind the billet to provide a continuous force which causes the plastic metal of the billet to flow through the extrusion die assuming the cross sectional shape of the die opening. The extruded strips pass through a canister which has a number of passageways aligned with the openings of the die. The strips then pass out of the canister and onto a run-out table. As the extruded strip is received by the run-out table, it is in a pliable state and readily subject to deformation. Accordingly, it has long been the practice to provide workers to guide the material as it passes over the run-out table. The workers have large pliers for gripping the extrusion strips and as the strips are extruded the workers walk along the run-out table and keep the strip separated to prevent the strips from buckling or touching each other. At the end of the extrusion of a billet of material, the workers strike the pliers a heavy blow with a hammer which breaks loose the extruded strip from the die.

Recently there has been developed an automatic extrusion gripper apparatus comprising a plurality of grippers mounted on an overhead track and depending downwardly into position for receiving the extruded strips. This type of apparatus has created the problem of how to break loose the extruded strips from the die since the workers are no longer utilized and as a result are not available to strike the grippers to free the extrusion from the die. Further, in many instances, any type of jerking is not sufficient to free the extrusion. This invention relates to a method and means for breaking or freeing such extrusions from the die.

An object of this invention is to provide a method for breaking extrusions from a die.

Another object of this invention is to provide a mechanism for breaking extrusions from a die.

Still another object of this invention is to provide a method and apparatus for breaking extrusions from dies, such methods and apparatus utilizing to the fullest extent the existing extruding equipment.

Other objects of my invention will become obvious upon reading the following specification in conjunction with the accompanying drawings wherein:

FIG. 1 is a side elevational view of the mechanism for breaking extrusions from a die. This figure schematically illustrates the relative position of such mechanism and an extrusion press;

FIG. 2 is a front elevational view of the equipment of FIG. 1;

FIG. 3 is a schematic illustration of the equipment viewed in the direction opposite to that wherein FIGURE 2 is viewed;

Figure 4:
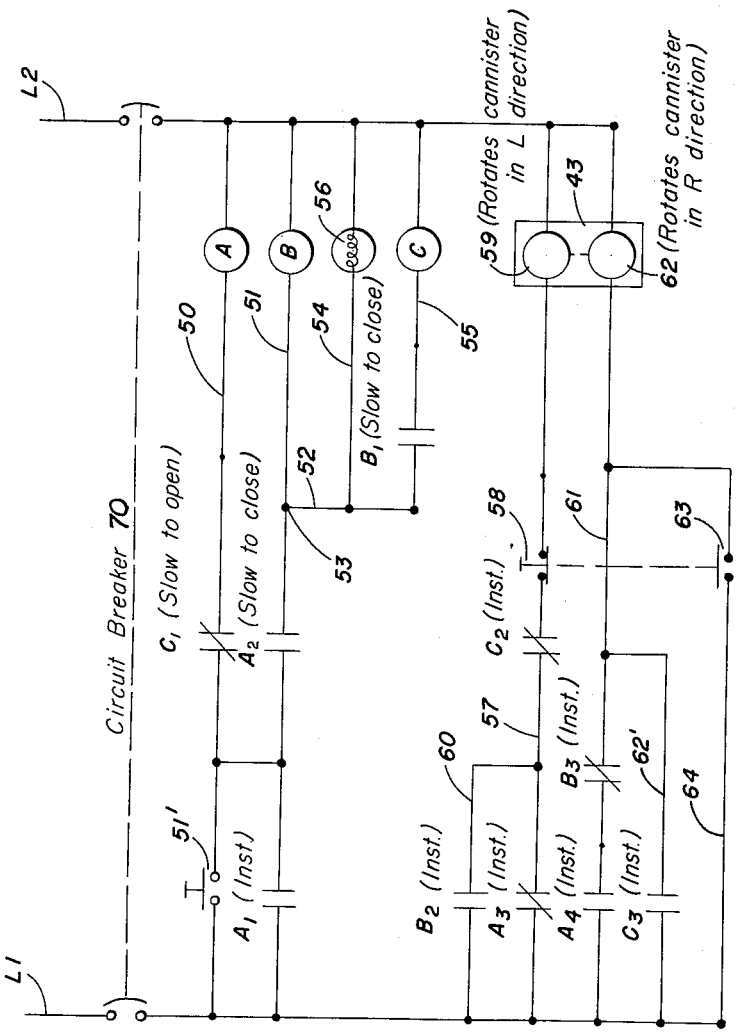
FIG. 4 is a schematic control circuit diagram for the mechanism.

Briefly, this invention relates to extruding apparatus which includes a press having a platen with an opening receiving a canister. Behind the canister is located a die supported by a die holder. The die is of the multi-hole type and accordingly the canister used with the die has a plurality of passageways each one of which is aligned with one of the die openings. Behind the die is located a housing or container for a billet. The billet is placed in the container in a semi-plastic state and a ram is provided for forcing the material of the billet through the die opening. As a result, extruded strips are formed which pass through the passageways of the canister and onto a run-out table. A means is provided for causing relative rotary movement between the die and the canister passageways wherein the same are rotated out of alignment with the die openings. As the canister rotates relative to the die, a pulling and shearing force is exerted on the extruded strips and as a result they are broken loose from the die.

The method of this invention includes the novel step of imparting relative movement between the die and the canister causing the extruded strips to break loose from the die.

Referring to the drawings, reference numeral 1 designates a press having a platen 2, a die holder 3, and billet housing or container 4. Located in the platen 2 is the canister 5 which, being slightly longer than the width of platen 2, extends from the face of the platen, providing an extended end 6. Located in the die holder 3 is the die 7 having a plurality of openings 8a, 8b, 8c and 8d. The canister is divided into several sections by the partition walls 10a and 10b, forming the passageways 9a, 9b, 9c and 9d, each one of which is aligned with one of these die openings 8a, 8b, 8c and 8d, respectively.

A billet 11 is located in the billet housing or container 4. This billet is in a semi-plastic state and adapted to be forced through the die openings by the ram 12. Accordingly, by this apparatus, as the ram forces the billet 11 against the die, the material of the billet is forced through the die openings 8a, 8b, 8c and 8d, forming the extruded strips 13a, 13b, 13c and 13d. These strips, respectively, pass through the passageways 9a, 9b, 9c and 9d. The walls 10a and 10b of the canister are constructed of graphite surfaces so that the soft extruded strips will not be marred thereby or stick to the walls of the canister.

This invention is particularly adapted to apparatus which has recently been developed for pulling and guiding the extruded strips as they pass out of the canister and onto the run-out table 14. Accordingly, there are shown gripper assemblies 20a and 20b, each including a depending support member 21a and 21b, respectively, on the ends of which are the housings 22a and 22b. Located in housings 22a and 22b are the clamping jaws 23a and 23b, respectively. Preferably, the grippers are suspended from an overhead track and they pull and guide the extruded strips along the run-out table 14 until the entire billet 11 is expended. At this time the grippers have difficulties in breaking loose the extruded strips from the die 7. This invention relates to this novel feature which includes the canister rotator mechanism designated by the reference numeral 30.

The canister rotator mechanism includes a housing 31 supported on the run-out table 14 by the brackets 32 and 33. The housing includes the front support plate 35 and the rear support plate 36. The two support plates 35 and 36 have aligned openings through which the extended end 6 of the canister extends. The canister is rotatably mounted on the front support rollers 37 of the front support plate 35 and the rear support rollers 38 of the rear support plate 36.

The canister 5 has a gear ring 39 meshed with or engaged by the driving gear 40. The canister is prevented from sliding in an axial direction by the thrust rollers 41 bearing on each side of the gear ring 39.

The driving gear 40 is driven by a fluid actuated torque motor 42, preferably of the reciprocating vane type. The direction of rotation of motor 42 is controlled by the valve assembly 43 having a forward solenoid 59 and a reverse solenoid 62 (FIG. 4) which will be more specifically set forth hereinafter.

The driving gear is driven by the motor 42 through the drive shaft 44 to which is also secured a cam member 45 which is provided for locking and positioning the canister in a pre-set position during the extruding of the strips. The cam member 45 is shaped to provide the latch engaging surface 46 which is engaged by the bell-crank shaped latch 47 which is pivoted on the pin 48. The latch 47 is actuated by the solenoid actuator 49 secured to the arm 50 of the latch. It should be readily evident that the latch 47 and cam member 45 lock the canister in a pre-set position in which the die openings 8a, 8b, 8c and 8d are aligned with the passageways 9a, 9b, 9c and 9d of the canister. It should also be readily evident that the release of the latch 47 and subsequent rotation of the canister 5 would misalign the die openings and canister passageways. As a result, when an extruded strip is extended through a canister passageway, a shearing and pulling force is exerted on the extruded strip. These forces ultimately break loose the extruded strips from the die.

Figure 3:
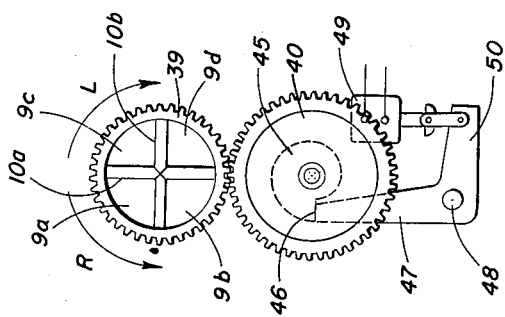

The control apparatus for accomplishing this end is shown in more detail in FIGS. 3 and 4. FIG. 3 shows substantially the same structure as shown in FIG. 2 but in more schematic form so that it can be used in conjunction with the circuit diagram of FIG. 4 to understand the operation of this invention.

The circuit of FIG. 4 includes the two lines $L_1$ and $L_2$ leading to a power source (not shown). Extending between these two lines is a circuit breaker 70 for making and breaking the connection between the two power lines $L_1$ and $L_2$ and the rest of the circuit.

Connected in series between the two lines $L_1$ and $L_2$ in the branch line 50 is the start button 51', the relay contact switch $C_1$ and the coil A of a time delay relay branch line 51, connected between the two power lines $L_1$ and $L_2$, has connected in series the relay contact switches $A_1$ and $A_2$ and the coil B of a second time delay relay. The line 52 is connected to line 51 at the point 53 and between line 52 and the power line $L_2$ are connected the lines 54 and 55. The coil 56 for the solenoid actuator 49 is located in the line 54 and in the line 55 is the relay contact switch $B_1$ and the coil C of a third time delay relay.

Also connected across the two power lines $L_1$ and $L_2$ is a branch line 57 having connected in series the normally closed relay contact switch $A_3$ and normally closed relay contact switch $C_2$, the reset switch 58 and the solenoid 59 of the control valve 43. Shunting the relay contact switch $A_3$ is a relay contact switch $B_2$ connected in the line 60. Connected in series in line 61 between the two power lines $L_1$ and $L_2$ are the relay contact switches $A_4$ and $B_3$ and also the reverse solenoid 62 of the control valve 43. Shunting the two relay contact switches $A_4$ and $B_3$ is the relay contact switch $C_3$ in the line 62' and the reset button 63 in the line 64.

It should be noted that the relay coil A controls the opening and closing of the relay contact switches $A_1$, $A_2$, $A_3$, and $A_4$. Similarly, relay coil B controls the opening and closing of the relay contact switches $B_1$, $B_2$, and $B_3$, while the relay coil C controls the operation of the relay contact switches $C_1$, $C_2$, and $C_3$.

Having described the various components of the control circuit and also the various elements of the mechanism, their operation in conjunction with each other will now be described.

*Operation*

The operation of this apparatus begins with a conventional extruding method step which includes the positioning of the die 7 in the die holder 3 and the billet 11 in the container or housing 4. Then power is applied to the ram 12 causing the semi-plastic material of billet 11 to be forced through the die openings 8a, 8b, 8c and 8d. The resultant extruded strips pass through the canister passageways 9a, 9b, 9c and 9d. The extruded strips are separated one from the other by the partition walls 10a and 10b and are prohibited from being marred or sticking to the walls of the canister by a coating of graphite on the walls.

As the extruded strips emerge from the canister they pass into gripper housings, such as 22a and 22b, and are subsequently gripped by clamping jaws, such as 23a and 23b. Then the gripper assemblies move away from the press down the run-out table, thus guiding the strips along the run-out table, keeping them separate one from the other.

After all the material of the billet 11 has been forced through die openings, 8a, 8b, 8c and 8d, the extruded strips remain stuck in the die and accordingly some means is provided to break the strips loose from the die. At this point of the operation or method, the circuit breaker 70 between lines $L_1$ and $L_2$ is closed. This closes the circuit through the line 57 since the relay contact switches $A_3$ and $C_2$ are normally closed and the reset switch 58 is closed. This energizes the solenoid 59 of the control valve assembly 43, causing the fluid torque motor 42 to exert a rotative force on driving gear 40, this force being transmitted to canister 5 in a direction indicated by the arrow L in FIG. 3. However, latch 47 bearing against the latch surface 46 of the cam member 45 prevents rotation of the canister in the L direction.

The start button 51' is then depressed to close the circuit through line 50. This immediately energizes the coil A which instantly closes the relay contact switches $A_1$ and $A_4$ and instantly opens relay contact switch $A_3$. Closing of relay contact switch $A_1$ initially causes current to flow through the relay contact $A_1$, the relay contact switch $C_1$ and the coil A. The opening of relay contact switch $A_3$, which is normally closed, de-energizes the solenoid 59 of the control valve assembly 43. Simultaneously, the closing of the relay contact switch $A_4$ energizes the solenoid 62 which actuates the valve control assembly 43, causing motor 42 to rotate the gear 40 in a clockwise direction (FIG. 3) and thus the canister 5 in a counterclockwise direction, designated by the arrow R in FIG. 3. This occurs for only a short time, however, since the relay contact switch $A_2$, which is slow to close, closes, thus closing the circuit through the coil B which actuates the relay contact switches $B_1$, $B_2$, and $B_3$.

This immediately opens the relay contact $B_3$ in line 61 and de-energizes the solenoid 62. Simultaneously, the relay contact $B_2$ in line 60 closes which again energizes the coil 59, causing the motor 42 to rotate the gear 40 and cam 45 in a counterclockwise direction (FIG. 3). This rotates the canister in a clockwise direction represented by the arrow L. In line 54 the coil 56 is energized, which pivots the latch 47 out of the path of the cam surface 46 of the cam 45. This permits the cam and gear and consequently the canister to be rotated to a position beyond the initial position at which it was set.

The rotation of the canister in the L direction occurs for only a short time and degree (about 180°) because the relay contact switch $B_1$, which is slow to close, ultimately closes and energizes the coil C which actuates the relay contact $C_1$, $C_2$, and $C_3$. $C_2$ is actuated instantly and since it is normally closed it opens, thus de-energizing the solenoid 59. The relay contact switch $C_3$ instantly closes by-passing relay contact switches $A_4$ and $B_3$ thus energizing the solenoid 62. This causes the motor 42 to rotate the cam 45 and gear 40 in a clockwise direction and thus the canister in a counterclockwise direction indicated by the arrow R. This occurs for a short time so that the canister rotates between 90 and 180 degrees. Rotation is stopped by the opening of the relay contact switch $C_1$, which is slow to open. This de-energizes the coil A, opening the relay contact switches $A_1$ and $A_2$ and thus de-energizing the coil B and C and the solenoid 56 of the latch. This puts the circuit back into its original condition wherein the circuit is closed through the solenoid 59 through the normally closed relay contact switches $A_3$ and $C_2$.

If the canister does not automatically line up to its original position at the end of the cycle, it can be backed up by pressing the reset button which closes contacts 63 and opens contact 58, de-energizing the solenoid 59 and energizing the solenoid 62. This reverses the rotatable direction of the canister to the R direction. Upon release of the reset button, the canister will then come back to its original position as shown by FIG. 3 where the latch surface of the cam member 45 is positioned against the upstanding arm of the latch 47.

The rotatable reciprocation of the canister in one direction and then the other causes the partition walls 10a and 10b of the canister to force the extruded strips 13a, 13b, 13c and 13d first to one side and then to the other, thus exerting a pull and shearing action on the strips. This causes the extruded strips to be pulled free of the die 7 after which the extruded strips are pulled clear from the canister, removed from the gripper and then removed from the run-out table.

It should be evident there is provided by this invention a simple means of breaking loose extruded strips from dies, particularly in this combination wherein a canister is used. This invention utilizes the existing equipment by making simple changes and adding simple additional mechanisms which easily accomplishes the desired end result.

Having described this invention, it should be understood that although a preferred form is shown, alterations and modifications are possible within the spirit of this invention. Therefore, this invention is to be limited only as set forth by the express language of the appended claims.

I claim:

1. Apparatus for extruding metal strips comprising a press having a die, a platen, and a canister located in said platen and having one end adjacent said die; said canister having a plurality of passageways corresponding in number to the number of openings in said die; said passageways being normally aligned with said die openings; means for forcing a semi-plastic billet of metal through said die openings to form elongated extruded strips of said metal; said strips passing through and out of said canister passageways; means for breaking loose said elongated extruded strips from said die including means for imparting a rotary movement to said canister about its axis such that said canister passageways are misaligned with said die openings.

2. Apparatus for extruding metal strips comprising a press having a die, a platen, and a canister located in said platen and having one end adjacent said die; said canister having a plurality of passageways corresponding in number to the number of openings in said die; said passageways being normally aligned with said die openings; means for forcing a semi-plastic billet of metal through said die openings to form elongated extruded strips of said metal; a run-out table for receiving said strips passing through and out of said canister passageways; gripper means for guiding said extruded strips along said run-out table and providing at least a holder means for the free ends of the extruded strips; and means for breaking loose said elongated extruded strips from said die including means for imparting a rotary movement to said canister about its axis such that said canister passageways are misaligned with said die openings.

3. Apparatus for extruding metal strips comprising a press having a die, a platen, and a canister located in said platen and having one end adjacent said die; said canister having a plurality of passageways corresponding in number to the number of openings in said die; positioner means for positioning and holding said canister in one rotary position wherein said passageways are normally aligned with said die openings; means for forcing a semi-plastic billet of metal through said die openings to form elongated extruded strips of said metal; said strips passing through and out of said canister passageways; means for breaking loose said elongated extruded strips from said die including means for releasing said positioner means and for imparting a rotary movement to said canister about its axis such that said canister passageways are misaligned with said die openings.

4. The device of claim 1 in which the means for breaking loose the extruded strip from said die includes a gear ring mounted on the periphery of a free end of said canister; a driving gear engaged with said gear ring; and a reciprocating rotary motive means driving said driving gear for imparting reciprocating rotary movement to said canister.

5. The device of claim 1 in which the means for breaking loose the extruded strips from said die includes a gear ring mounted on the periphery of a free end of said canister; a driving gear engaged with said gear ring; a cam and latch mechanism including a cam movable with said driving gear and a releasable latch in one position engaging said cam for preventing movement thereof; and means for releasing said latch from engagement with said cam for permitting rotary movement of said canister by said motive means.

References Cited in the file of this patent

UNITED STATES PATENTS

| | | |
|---|---|---|
| 365,473 | Hinsdale | June 28, 1887 |
| 1,366,693 | Kremble | Jan. 25, 1921 |
| 1,951,841 | Roberts | Mar. 20, 1934 |
| 2,720,310 | Yack et al. | Oct. 11, 1955 |
| 2,893,552 | Davies | July 7, 1959 |
| 2,930,482 | Hanes | Mar. 29, 1960 |
| 2,950,815 | Oberg | Aug. 30, 1960 |
| 3,025,564 | Voigt | Mar. 20, 1962 |

FOREIGN PATENTS

| | | |
|---|---|---|
| 777,362 | Great Britain | June 19, 1957 |